United States Patent [19]

Lipschitz

[11] Patent Number: 5,052,694
[45] Date of Patent: Oct. 1, 1991

[54] HYDROSTATIC FACE SEAL AND BEARING

[75] Inventor: Abraham Lipschitz, Warwick, R.I.

[73] Assignee: EG&G Sealol, Inc., Wellesley, Mass.

[21] Appl. No.: 532,230

[22] Filed: Jun. 5, 1990

Related U.S. Application Data

[63] Continuation of Ser. No. 883,371, Jul. 8, 1986, abandoned.

[51] Int. Cl.$^5$ ............................................. F16J 15/34
[52] U.S. Cl. .......................................... 277/3; 277/15;
277/27; 277/72 R; 277/74; 277/75; 277/96.1
[58] Field of Search .................. 277/81 R, 25, 3.15,
277/74, 75, 72 FM, 96.1, 27, 72 R

[56] References Cited

U.S. PATENT DOCUMENTS

| | | | |
|---|---|---|---|
| 3,033,577 | 5/1962 | Spiess | 277/74 X |
| 3,499,653 | 3/1970 | Gardner | 277/96.1 X |
| 3,556,538 | 1/1971 | Muller | 277/74 |
| 3,572,727 | 3/1971 | Greiner | 277/74 |
| 3,926,442 | 12/1975 | Muller | 227/74 X |
| 4,523,764 | 6/1985 | Albers et al. | 277/72 FM X |

FOREIGN PATENT DOCUMENTS

| | | | |
|---|---|---|---|
| 224096 | 4/1959 | Australia | 277/74 |
| 0097892 | 1/1984 | European Pat. Off. | |
| 1239150 | 4/1967 | Fed. Rep. of Germany | |
| 2444544 | 4/1976 | Fed. Rep. of Germany | |
| 1268692 | 6/1961 | France | |
| 1418240 | 10/1965 | France | 277/74 |
| 2144969 | 1/1973 | France | |
| 369328 | 6/1963 | Switzerland | 277/74 |
| 663923 | 5/1979 | U.S.S.R. | 277/74 |
| 980895 | 1/1965 | United Kingdom | 277/74 |
| 1558077 | 12/1979 | United Kingdom | |
| 2118641 | 11/1983 | United Kingdom | |

OTHER PUBLICATIONS

Lindeboom, Hydrostatic Design Concept Applied to Dynamic Sealing Devices, presented at the Petroleum Mechanical Engineering Conference, Phila., Pa., Sep. 17-20, 1967.

Primary Examiner—Allan N. Shoap
Attorney, Agent, or Firm—Finnegan, Henderson, Farabow, Garrett & Dunner

[57] ABSTRACT

A hydrostatic seal includes a high pressure cavity in one of two opposed sealing faces between a shaft and housing for supplying a pressurized barrier fluid between the opposed sealing faces, and an arrangement for preventing passage of the barrier fluid into the interior of the housing and for preventing the passage of machine fluid from the housing into the high pressure cavity. The arrangement includes a first circumferential dam for providing a narrow gap between the high pressure cavity and the interior of the housing and a system for maintaining the pressure of the barrier fluid in the high pressure cavity substantially equal to the pressure of the machine fluid in the housing. A discharge cavity is provided in one of the sealing faces for discharging barrier fluid from between the opposed barrier faces and preventing barrier fluid from leaking between the housing and the shaft to the ambient. A second circumferential dam is positioned between the high pressure cavity and the discharge cavity, and a third circumferential dam is positioned between the discharge cavity and the ambient.

11 Claims, 7 Drawing Sheets

HYDROSTATIC FACE SEAL AND BEARING

This application is a continuation of application Ser. No. 06/883,371 filed July 8, 1986, now abandoned.

BACKGROUND OF THE INVENTION

1. Field of the Invention

The present invention relates to hydrostatic seals used between a rotating shaft and a housing.

2. Description of the Related Art

Conventional balanced or pusher-type contacting seals have been used to minimize leakage between a rotating or reciprocating shaft and a housing. However, friction and associated heat production can be significant and in some applications lead to failure of the rubbing elements. As a result it is difficult to predict the performance of such seals.

Hydrostatic and hydrodynamic film riding seals subsequently were developed in order to minimize friction and wear and to allow for more accurate performance prediction. In known hydrostatic seals, a film of fluid between spaced sealing faces replaces conventional contacting sealing elements such as carbon/ metallic rings. Such fluid forming the film is known as an "active" fluid. These seals have proven superior to contacting seals with respect to friction and wear. However, they are subject to leakage problems.

With known hydrostatic seals, either machine fluid leaks out of the housing or active fluid between the spaced sealing faces leaks into the housing. In some applications, when machine fluid from the housing leaks out through the hydrostatic seal, dirt in the machine fluid causes excessive wear to the faces of the seal. This problem becomes especially serious when the machine fluid is a poor lubricant such as FREON ®. Further, excessive leakage of machine fluid from the housing through the seal necessitates frequent replenishing of the machine fluid in the housing and other associated costly maintenance.

In some applications, when active fluid leaks into the housing fluid through a hydrostatic seal, it may be necessary to limit the active fluid to the same substance as the machine fluid. Further, leakage of the active fluid into the housing necessitates frequent replenishing of the active fluid, thus increasing maintenance costs. In other applications, additional problems arise as a result of the leakage of machine or active fluid past the hydrostatic seal.

Accordingly, it is an object of the invention to provide a hydrostatic seal that effectively seals a shaft in a housing against leakage of the machine fluid between the faces of the hydrostatic seal.

It is also an object of the present invention to provide a hydrostatic seal in which active fluid between opposed sealing faces does not leak into the housing.

It is a further object of the invention to provide a hydrostatic seal in which no active fluid or machine fluid leaks out of the seal on the ambient side of the seal.

It is another object of the invention to provide a hydrostatic seal which relies purely on hydrostatic effect of an active fluid and is substantially independent of the dynamic conditions of the sealed system.

It is another object of the present invention to provide a hydrostatic seal that prevents leakage through the seal even when the active fluid has a low viscosity or when the speed of shaft rotation is low.

Similar disadvantages are present with known hydrostatic bearings and accordingly, it is an object of the present invention to provide a hydrostatic bearing in which these disadvantages are overcome.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and as broadly described herein, there is provided a hydrostatic seal for sealing, from the ambient, a pressurized machine fluid in the interior of a housing fitted with a shaft. The seal comprises opposed sealing faces on the housing and the shaft; high pressure cavity means in one of the sealing faces for applying a pressurized barrier fluid between the opposed sealing faces; and means for preventing passage of the barrier fluid into the interior of the housing and for preventing the passage of the machine fluid into the high pressure cavity. The preventing means includes dam means for providing a narrow gap along a portion of the sealing faces between the high pressure means and the interior of the housing. There also is provided discharge cavity means in one of the sealing faces for discharging barrier fluid from between the opposed sealing faces and preventing barrier fluid from leaking between the housing and the shaft to the ambient.

Additionally, in accordance with the present invention there is provided a hydrostatic bearing for a housing with a shaft. The bearing includes opposed bearing faces on the housing and the shaft; high pressure cavity means in one of the bearing faces for supplying a pressurized bearing fluid between the opposed bearing faces; and discharge cavity means in one of the bearing faces for discharging bearing fluid from between the opposed bearing faces and preventing bearing fluid from leaking between the shaft and the housing.

BRIEF DESCRIPTION OF THE DRAWINGS

The accompanying drawings, which are incorporated in and constitute a part of this specification, illustrate presently preferred embodiments of the invention and, together with the general description given above and the detailed description of the preferred embodiments given below, serve to explain the principles of the invention.

DESCRIPTION OF THE PREFERRED EMBODIMENT

Reference will now be made in detail to the present preferred embodiments of the invention, examples of which are illustrated in the accompanying drawings. Throughout the drawings, like reference characters are used to designate like elements.

In accordance with the present invention, there is provided a hydrostatic seal for sealing, from the ambient, a pressurized machine fluid in the interior of a housing fitted with a shaft comprising opposed sealing faces on the housing and the shaft; high pressure cavity means in one of the sealing faces for supplying a pressurized barrier fluid between the opposed sealing faces; and means for preventing passage of the barrier fluid into the interior of the housing and for preventing the passage of the machine fluid into the high pressure cavity means.

Figure 1:
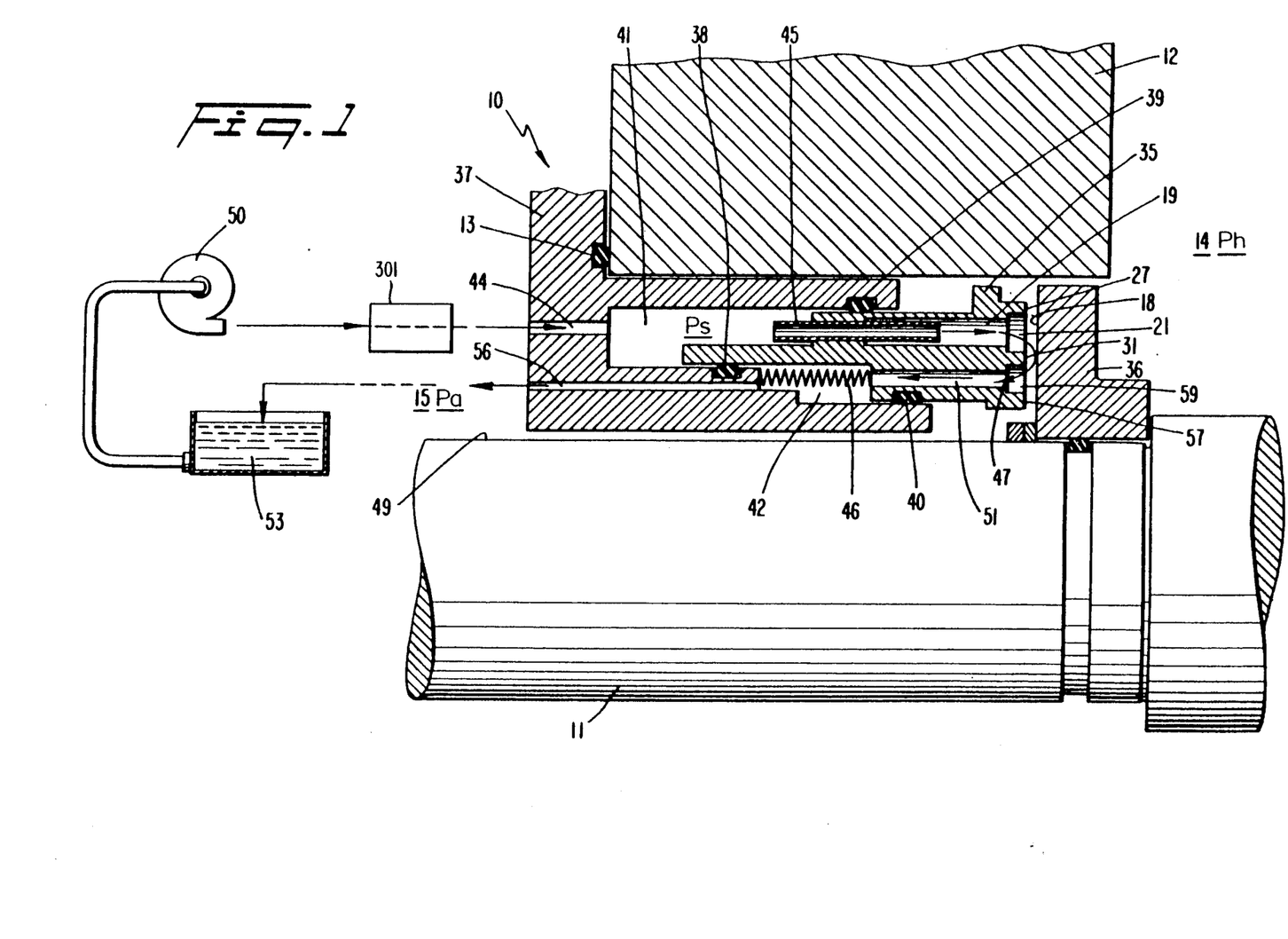
FIG. 1 is a cross sectional view of an embodiment of a hydrostatic seal according to one preferred embodiment of the invention.

As shown and embodied in FIG. 1, a hydrostatic seal 10, is formed between a shaft 11 and a machine housing 12. Machine fluid 14 at a pressure $P_h$ is in the interior of housing 12. The ambient 15 is at a pressure $P_a$. $P_h$ generally is substantially greater than the ambient pressure $P_a$ outside of the seal.

Figures 2, 3, 4:
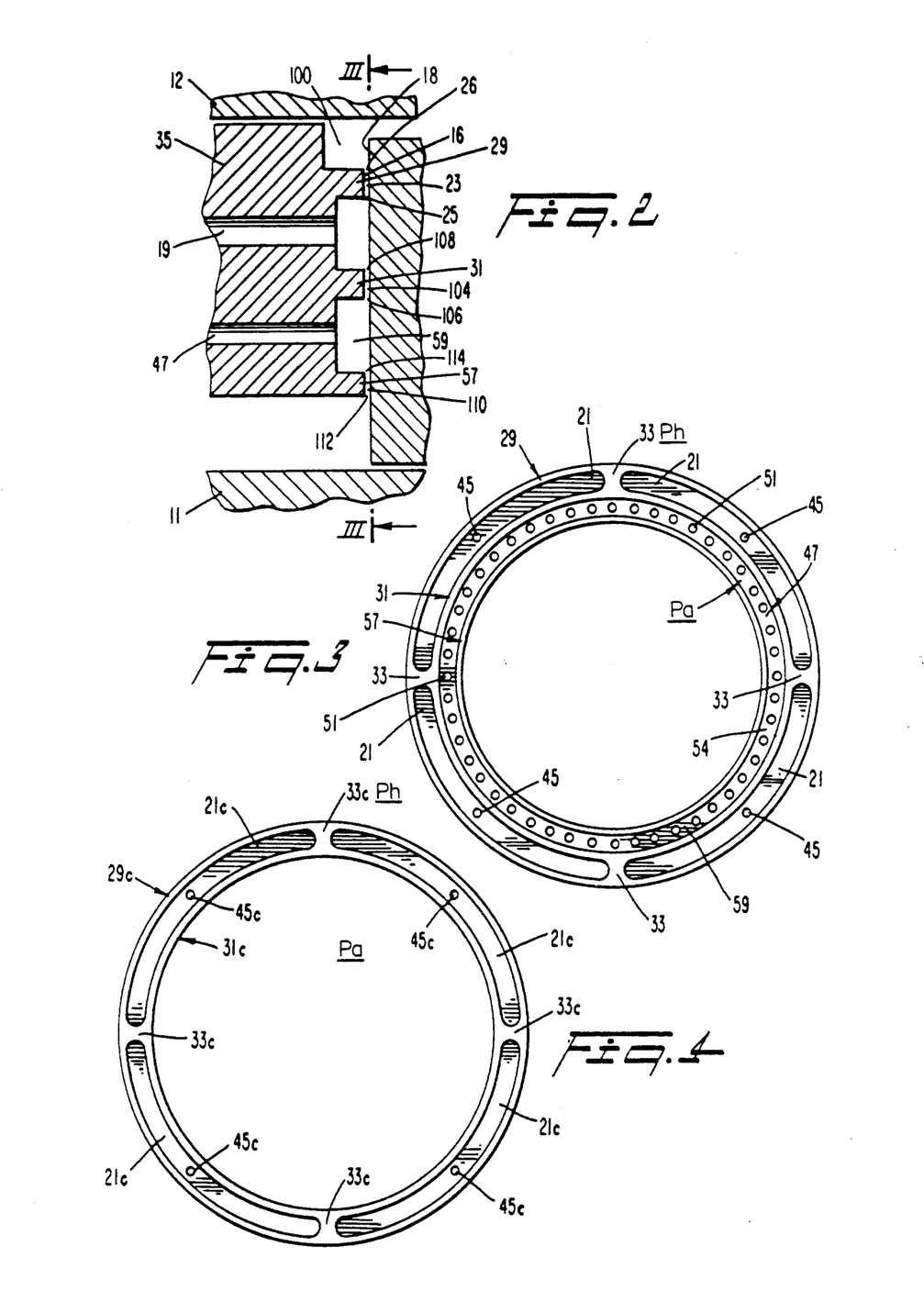
FIG. 2 is an enlarged fragmentary cross-sectional view of one embodiment of FIG. 1 to illustrate opposed sealing faces.
FIG. 3 is a front view of a sealing face taken along line III—III of FIG. 2.
FIG. 4 is a front view similar to FIG. 3 showing a sealing face of another preferred embodiment of the present invention.

According to the present invention, opposed sealing faces are provided on the housing 12 and the shaft 11. As shown in FIG. 2, the opposed sealing faces include a first sealing face 16 and a second sealing face 18. First sealing face 16 includes the surfaces of dams 29, 31 and 57 which can be seen from an end view in FIG. 3. Sealing face 16 defines one axial end of a seal ring 35 that is mounted within the housing 12. Sealing face 18 includes the surface directly opposite these areas on a seat ring ring 36 fixed to the shaft 11, as shown in FIG. 1. Alternatively, sealing face 18 may be on a rim of the shaft 11. The seat ring 36 is sealed and fixed to the shaft 11 for rotation with the shaft. As embodied in FIG. 2, the sealing faces 16, and 18 are planar, parallel to each other and perpendicular to the axis of the shaft 11. However, other arrangements will be described for other embodiments of the invention. The sealing faces should be precisely machined to remove irregularities in order to prevent them from wobbling and so that the dynamic behavior of the seal will not deviate significantly from the static behavior of the seal.

According to the present invention, there is provided high pressure cavity means in one of the sealing faces for supplying a pressurized barrier fluid between the opposed sealing faces. As shown in FIG. 1, the high pressure cavity means includes a high pressure cavity 19, which is provided in the first sealing face 16. High pressure cavity 19 includes both pocket 21 and the conduit area immediately to the left of pocket 21 shown in FIG. 1. Alternatively, the high pressure cavity 19 could be provided in the second sealing face 18 or high pressure cavities could be provided in both the first and second faces 16, 18. The high pressure cavity 19 receives a pressurized barrier fluid from channel 44 and reservoir 41, and supplies the pressurized barrier fluid between the first and second sealing faces 16, 18.

According to the present invention, there is provided means for preventing passage of the barrier fluid into the interior of the housing and for preventing passage of the machine fluid into the high pressure cavity. The preventing means includes first dam means for providing a narrow gap along a portion of the sealing faces between the high pressure cavity and the interior of the housing. As shown in FIGS. 2 and 3, first dam means includes a first circumferential dam 29 on sealing face 16 which provides a gap 23. FIG. 2 shows the seal in operation such that gap 23 has a narrow width, defined as the distance between faces 16 and 18. Figures other than FIG. 2 show the seal faces spaced apart substantially farther than during operation for facilitating illustration of the components.

Although first dam means is shown in FIGS. 1 and 2 as being radially outward of the high pressure cavity 19, it is intended that first dam means could alternatively be positioned radially inward of high pressure cavity 19 as in the case where the sealed machine fluid 14 is radially inward from the sealing faces 16, 18. In such a case, the high pressure cavity will be internal of a drain cavity 47 in a configuration opposite that shown in FIG. 1. The major drawback of such a configuration is that small centrifugal forces created by the rotation of the shaft 11 and the seat ring 36 which help contain barrier fluid in drain cavity 47 when the first dam means is radially outward of the high pressure cavity will work against the containment of the barrier fluid in drain cavity 47.

According to the invention, the first dam means is defined by first and second boundaries for permitting the barrier fluid from the high pressure cavity to pass the first boundary and preventing the barrier fluid from the high pressure cavity from passing the second boundary, and permitting the machine fluid from the interior of the housing to pass the second boundary and preventing the machine fluid from the interior of the housing from passing the first boundary.

As shown in FIG. 2, a first boundary 25 and a second boundary 26 are located on the edges of face 27 of first dam 29. Because of this construction and the pressure relationship of the system, barrier fluid supplied to cavity 19 can pass the first boundary 25 but cannot pass the second boundary 26 while machine fluid 14 can pass the second boundary 26 but not the first boundary 25 when gap 23 is narrow as shown in FIG. 2. As shown in FIG. 1, the first boundary 25 is defined by both the radially outer edge of the cavity 19 and the radially inner edge of the first dam 29. The second boundary 26 is spaced radially outward from the first boundary 25. The distance along the face 27 of first dam 29 between first and second boundaries 25 and 26 is substantially longer than the width of the narrow gap 23 between faces 16 and 18.

According to the present invention, the preventing means includes means for maintaining the pressure of the barrier fluid in the high pressure cavity means substantially equal to the pressure of the machine fluid in the interior of the housing. As embodied herein, when the pressure of the barrier fluid in the high pressure cavity 19 is maintained substantially at the same pressure as the machine fluid 14 in the housing 12, then the barrier fluid will not be driven across the gap 23 into the machine housing and machine fluid 14 will not be driven across the gap 23 into the area of the high pressure cavity 19.

Figure 6:
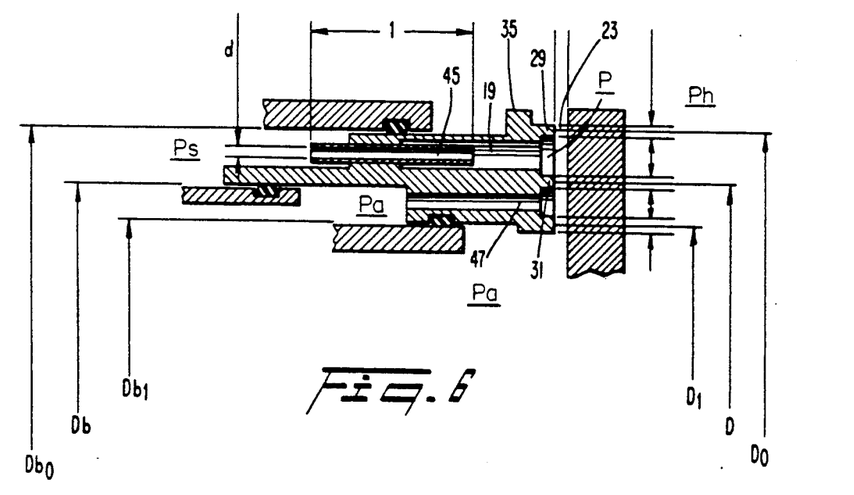
FIG. 6 is a fragmentary cross-sectional view of the seal of FIG. 1 omitting the housing and shaft to illustrate exemplary dimensions.

The pressure in high pressure cavity 19 is controlled by the geometry of a flow restriction, as for example restriction tube 45, the seal ring 35 (which is maintained by proper choice of all pressurized diameters as shown in FIG. 6), the supply pressure shown in FIG. 6 as Ps, and the machine fluid pressure $P_h$. Once a fixed geometry is established (O-ring seal diameters, face dam diameters, and the size of the restriction tube 45), the only two variables remaining are the supply pressure $P_s$ and machine pressure $P_h$.

The flow through restriction tube 45 is proportional to the drop ($P_s$ minus P, where P is the pressure of the barrier fluid in the high pressure cavity 19) across the restriction tube 45. The flow across first dam 29 is also proportional to the pressure drop (P minus $P_h$) across dam 29. The flow from cavity 19 to the discharge cavity 47 is proportional to the pressure drop (P minus $P_a$) across second dam 31. By employing the principal of mass conservation and by allowing P to equal $P_h$ in order to obtain zero leakage across first dam 29, and by assuming that $P_a$ is much smaller than $P_h$, we find that $P_s/P_h$ equals a constant. Therefore, a simple proportional pressure regulator 301 in combination with the geometric considerations discussed above, will allow maintenance of the condition in which P equals $P_h$ and leakage across the peripheral dam 29 is prevented.

According to the present invention the preventing means includes a biasing means for biasing the sealing faces together while maintaining a narrow gap between the sealing faces. As shown in FIG. 1, sealing face 16 is mounted on the seal ring 35 which is axially moveable relative to sealing face 18 and housing 12 to compensate for movement, during operation, of sealing faces 16 and 18 due to machine vibration or thermal expansion of machine parts. In order to maintain the narrow gap 23 between the sealing faces 16 and 18, the first sealing face 16 is biased toward the second sealing face 18 by biasing means such as the pressurized reservoir 41 of barrier fluid which acts on the left side of seal ring 35 as shown in FIG. 1.

According to the present invention, the biasing means maintains the gap 23 at a substantially constant width. This is accomplished by controlling the pressure of the barrier fluid in the reservoir 41 which in turn, controls the pressure of barrier fluid in cavity 19.

Figure 5:
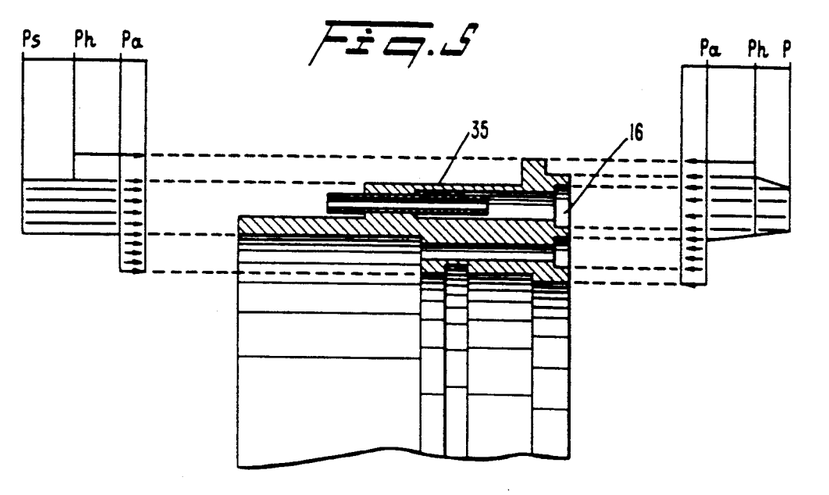
FIG. 5 is a schematic diagram illustrating an example of pressure distribution on the axial ends of the seal ring shown in FIG. 1.

The pressure of the barrier fluid in the reservoir 41 acts against one end of the seal ring 35 while the pressure of the fluid on the first sealing face 16 acts upon the seal ring 35 in the opposite direction, as shown in FIG. 5. FIG. 5 shows a hydrostatic distribution on the seal ring 34 wherein the pressures, $P_h$, $P_s$ and $P_a$ urge the seal ring 34 toward the second sealing face 18 while the pressures from the pressurized barrier fluid issuing from cavity 19 and the machine fluid act on the first sealing face 16 of the seal ring 35 to urge the seal ring in an opposite direction. The pressure distribution on the sealing face 16 of seal ring 35 that is shown FIG. 5 is one possible distribution for the present invention. The seal ring diameters $D_{bo}$, $D_b$, and $D_b$; on the cavity side of the seal ring and the diameters $D_i$, D and $D_0$ on the sealing face end of the seal ring, as shown in FIG. 6, are computed and designed such that the pressures on the seal ring 35 as shown in FIG. 5 balance each other in a way that maintains width of the narrow gap 23 at a desired value.

According to the present invention, the first dam means includes a first circumferential dam on one of the sealing faces. As embodied herein, a first circumferential dam 29 is formed on the first sealing face 16 and surrounds the high pressure cavity 19 in an annular configuration as shown in FIG. 3.

According to the present invention there is provided second dam means which includes a second circumferential dam on one of the sealing faces which is spaced from the first circumferential dam for surrounding the high pressure cavity means and forming at least one high pressure pocket defined by the first and second circumferential dams. As shown in FIG. 3, the second circumferential dam 31 is a raised area formed on the first sealing face 16. The second circumferential dam 31 is positioned radially inward of the high pressure cavity 19 and the first circumferential dam 29.

At least one high pressure pocket 21 is defined by the first circumferential dam 29 and the second circumferential dam 31. The high pressure pocket 21 extends circumferentially around the sealing face 16.

According to the present invention, there is provided spacer dams extending between the first and second circumferential dams for dividing said at least one high pressure pocket into a plurality of high pressure pockets. As shown in FIG. 3, raised spacer dams 33 are formed on the first sealing face 16 and extend between the first circumferential dam 29 and the second circumferential dam 31. Although four spacer dams 33 and four high pressure pockets 21 are shown in FIG. 3, any number of pockets are possible depending upon the angular responsiveness required for the first sealing face. A greater number of pressure pockets, as for example 9 or 11 pockets, results in a sealing face that is more responsive than a sealing face with a low number of pockets. Pressure changes in the barrier fluid, created by changes in gap width, are more exactly transferred to the first sealing face 16 when small pockets absorb all of the pressure change in the vicinity of where the pressure change occur.

According to the present invention, the narrow gap provided by the first dam means has a width between the opposed sealing faces that is substantially narrower than the length along the first dam means between the first and second boundaries. As shown in operation by FIG. 2, the width of gap 23 between faces 16 and 18 is substantially narrower than the length along the face of the first circumferential dam 29 between first boundary 25 and second boundary 26. The width of the gap is predetermined and is maintained stable due to the axial and angular stiffness of the system.

According to the present invention the width of the gap is preferably between about 0.0001 inches and 0.0020 inches and the length along the face 27 of the first dam 29 between boundaries 25 and 26 is between about 0.050 inches and 1.000 inches.

According to the embodiment of the invention shown in FIG. 1, the opposed sealing faces are axially opposed and one of the sealing faces is axially displaceably relative to the other sealing face. As shown in FIG. 1 sealing face 16 is axially displaceable along the axis of the shaft 11 relative to the sealing face 18.

According to the present invention there is provided a seal ring, wherein the seal ring includes one of the sealing faces and wherein the seal ring is displaceable relative to the other sealing face for maintaining the gap between the sealing faces. As shown in the embodiment of FIG. 1, a seal ring 35 is mounted on the housing 12. This seal ring 35 includes the first sealing face 16 and is radially inward from the housing 12. The second boundary 26 of first circumferential dam 29 on the first sealing face 16 of seal ring 35 is also spaced radially from the housing 12 to form a non-dammed area 100 between second boundary 26 and the housing 12 shown in FIG. 2. The seal ring 35 is axially displaceable relative to the second sealing face 18 so that the narrow gap between the sealing faces can be maintained.

According to the invention there is provided a seal ring housing for supporting the seal ring. As shown in FIG. 1, a seal ring housing 37 is attached to the machine housing 12. A static seal 13 is positioned between seal ring housing 37 and seal ring 35. The seal ring housing 37 extends circumferentially around the shaft 11 and is positioned within an opening in the machine housing 12.

According to the present invention, the seal ring housing includes a pressurized reservoir cavity means for permitting displacement of the seal ring relative to the seal ring housing and for urging the sealing faces toward one another. As shown in FIG. 1, the pressurized reservoir cavity means includes pressurized circumferential reservoir cavity 41 which allows axial movement of the seal ring 35. A feed inlet channel 44 supplies reservoir 41 with pressurized barrier fluid from a pump 50 at a pressure $P_s$. Seal 38 separates barrier fluid in reservoir 41 from discharge area 42, seal 39 separates barrier fluid in reservoir 41 from machine fluid 14 and seal 40 separates discharge area 42 from the shaft periphery. Seals 38, 39 and 40 may be comprised of an elastomer. The seals 38, 39 and 40 also permit the seal ring and seal housing to be dimensioned relative to one another for permitting some angular flexibility which allows the seal ring 35 to compensate for changes in the alignment of the opposed sealing faces, as may occur when the seat ring 36 wobbles. The force created by the pressurized barrier fluid in the reservoir 41 on the seal ring 35 urges the first sealing face 16 toward the second sealing face 18.

According to the present invention there is provided spring means interposed between the seal ring housing and the seal ring for urging the sealing faces toward one another when the reservoir cavity means is not pressurized, wherein the force of the spring means is substantially smaller than the forces on the sealing faces when the reservoir cavity is pressurized. As shown in FIG. 1, spring 46 produces an axial urging force on the seal ring 35 that is substantially smaller than the force on the seal ring 35 produced by the pressurized barrier fluid and the machine fluid on the first sealing face 16 when the barrier fluid in the high pressure cavity 19 is pressurized. When the system is not in operation and the barrier fluid is not being pressurized, the spring 46 closes the gap between the sealing faces 16 and 18. When the shaft 11 is in motion, however, the barrier fluid is to be pressurized so that the spring 46 does not close the gap 23 and the relatively moving sealing faces do not contact each other.

The three elastomer seals 38, 39 and 40 may be replaced by three annular metal bellows that seal the spaces between the seal ring housing 37 and the seal ring 35 and serve as a spring in lieu of spring 46. The elastomer seals or the metal bellows may also serve to absorb any small torque that is transferred from the shaft 11 and the rotating second sealing face 18 to the seal ring 35 when the shaft rotates.

According to the present invention means for providing film stiffness to the seal by resisting relative movement of the sealing faces are provided. The means for providing stiffness includes at least one flow restriction for supplying the high pressure cavity means with barrier fluid. In the event that a local disturbance in the preferred width of the gap between sealing faces 16 and 18 occurs, for example, the gap width increases, then the pressure in the high pressure cavity 19 drops as barrier fluid escapes more freely from the high pressure cavity 19 to the drain cavity 47. The inherent resistance of the restriction tube 45 does not allow an immediate replenishment of barrier fluid into the high pressure cavity 19 and as a result, the lower pressure (relative to the preferred pressure) in the high pressure cavity 19 creates a restoring force which brings the width of gap 23 back to the preferred distance. The same restoring mechanism acts to separate the faces when the width of gap 23 becomes smaller than the preferred distance. As shown in FIG. 3, each of the pockets 21 has a flow restriction tube 45 in communication with the respective pocket. The restriction tubes 45 have a diameter small enough and a length long enough so that sudden changes in pressure in any one of the high pressure pockets 21 is not instantly transmitted through the restriction tubes 45 to be absorbed by another part of the system.

Because the pressure changes are not instantly transmitted through the restriction tubes, changes to the pressure of the fluid in the high pressure pockets that occur when the second sealing face 18 moves, cause the first sealing face to move in response. Angular and axial stability of the seal ring and first sealing face is enhanced by this stiffness supplying means. On the other hand, the restriction tubes 45 must have a width large enough to allow for the desired flow of pressurized barrier fluid into the high pressure cavity 19. Restriction tubes with internal diameters preferably ranging from 0.010 inches to 0.030 inches and lengths from 0.030 inches to 1.000 inches have been found to meet the above performance standard.

According to the present invention there is provided discharge cavity means on one of the sealing faces for discharging barrier fluid from between the opposing sealing faces and for preventing barrier fluid from leaking between the housing and the shaft to the ambient. As shown in FIGS. 1 and 3, the discharge cavity means includes discharge cavity 47 which discharges barrier fluid from between the sealing faces 16 and 18 and prevents barrier fluid from leaking between the shaft 11 and the seal ring housing 37 along the outer radial surface 49 of the shaft 11. The pressure in the discharge cavity 47 is substantially equal to the ambient pressure $P_a$. As shown in FIG. 3, discharge cavity 47 includes a plurality of fluid outlet passages 51 provided in flow communication with the annular discharge pocket 59 for removing barrier fluid from the discharge cavity. The outlet passages 51 communicate with a discharge channel 56 in the seal ring housing 37. The discharged channel 56 supplies barrier fluid to the pump tank 53. The seal ring fluid outlet passages 51 are sealed to the seal housing discharge channel 56 by seals 38 and 40.

According to the invention there is provided a second dam means on one of the sealing faces for providing a narrow gap along a portion of the sealing faces between the high pressure cavity means and the discharge cavity means. As shown in FIGS. 1 and 3, second dam means includes second circumferential dam 31 which is spaced between the high pressure cavity means 19 and the discharge cavity 47.

In accordance with the present invention the narrow gap provided by the second dam means has a width between opposed sealing faces that is substantially narrower than the length of the second dam means between the high pressure cavity means and the discharge cavity means. As shown in FIG. 2, the width of gap 104 between faces 16 and 18 is substantially less than the length of second dam 31 between boundaries 106 and 108.

According to the present invention there is provided a third dam means on one of the sealing faces for providing a narrow gap along a portion of the sealing faces between the discharge cavity and the ambient. As shown in FIGS. 1 and 3, a third circumferential dam 57 on the first sealing face 16 is spaced radially inward of the annular discharge cavity 47 and is spaced radially outward of the shaft 11. The second circumferential dam 31 and the third circumferential dam 57 together define a circumferential discharge pocket 59 that is a part of the discharge cavity 47.

According to the present invention, the narrow gap provided by the third circumferential dam has a width between the opposed sealing faces that is substantially narrower than the length of the third circumferential dam between the discharge cavity and the ambient. As shown in FIG. 2, the width of gap 110 between faces 16 and 18 is substantially less than the length of third dam between boundaries 112 and 114. The narrow gaps provided by the second circumferential dam 31 and the third circumferential dam 57 have widths substantially equal to the width of the gap 23 corresponding to the first circumferential dam 29, that is preferably between about 0.00010 inches and 0.0020 inches.

According to the present invention, the first, second and third dam means are spaced circumferential dams. As shown in FIG. 3, first dam 29, second dam 31 and third dam 57 on the first sealing face 16 are spaced circumferential dams coaxial with the shaft 11.

The discharge cavity 47 collects the fluid which crosses the second dam 31 and is discharged back to the pump tank 53 which is kept at ambient pressure. Leakage to the shaft periphery is eliminated by the free passageway for the barrier fluid provided by the discharge cavity 47 as well as by the centrifugal forces which develop in the gap between the third dam 57 and the rotating seat 36.

In accordance with the embodiment shown in FIG. 1 of the invention, the pressurized reservoir cavity means is in fluid communication with the high pressure cavity means for both supplying the high pressure cavity means with barrier fluid and for biasing the sealing faces together.

Figure 7:
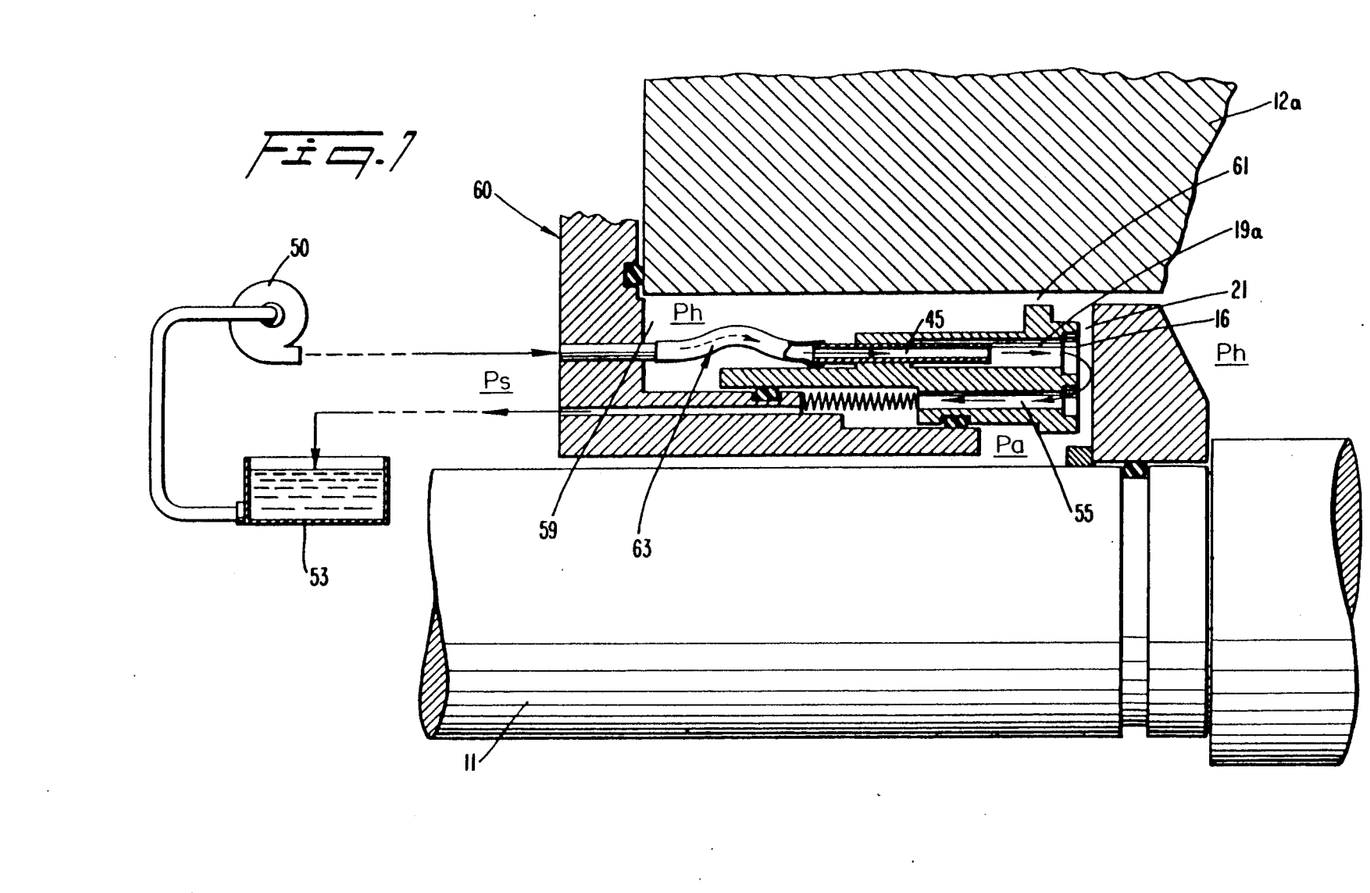
FIG. 7 is a fragmentary cross-sectional view of another preferred embodiment of a hydrostatic seal according to the present invention.

Referring to FIG. 7, and in accordance with another embodiment of the invention, the pressurized reservoir cavity means is in fluid communication with the interior of the housing for biasing the sealing faces together by supplying the pressurized reservoir cavity means with machine fluid. Means for isolating the high pressure cavity means from the pressurized reservoir cavity means and for supplying pressurized barrier fluid between the sealing faces are also provided. The isolating means includes at least one flexible conduit attached to the seal ring and passing through the pressurized reservoir cavity means. As shown in FIG. 7, a fluid reservoir 59 is formed between a seal ring housing 60 and the machine housing 12a. The reservoir 59 is in fluid communication with the interior of machine housing 12a so that pressurized machine fluid passes through the annular passage 61. Flexible inlet hoses 63 supply the high pressure cavity 19a with pressurized barrier fluid that is supplied through the feed channel 65 in the seal adaptor 60. A similar flexible inlet hose is provided for each restriction tube 45 in order to supply the respective high pressure pockets 21 with pressurized sealing fluid. The flexible hoses 63 pass through the reservoir 59. The hoses are connected to a seal adaptor feed channel 65 that supplies pressurized sealing fluid from a pump 50 that pumps the barrier fluid from a pump tank 53.

Figure 8:
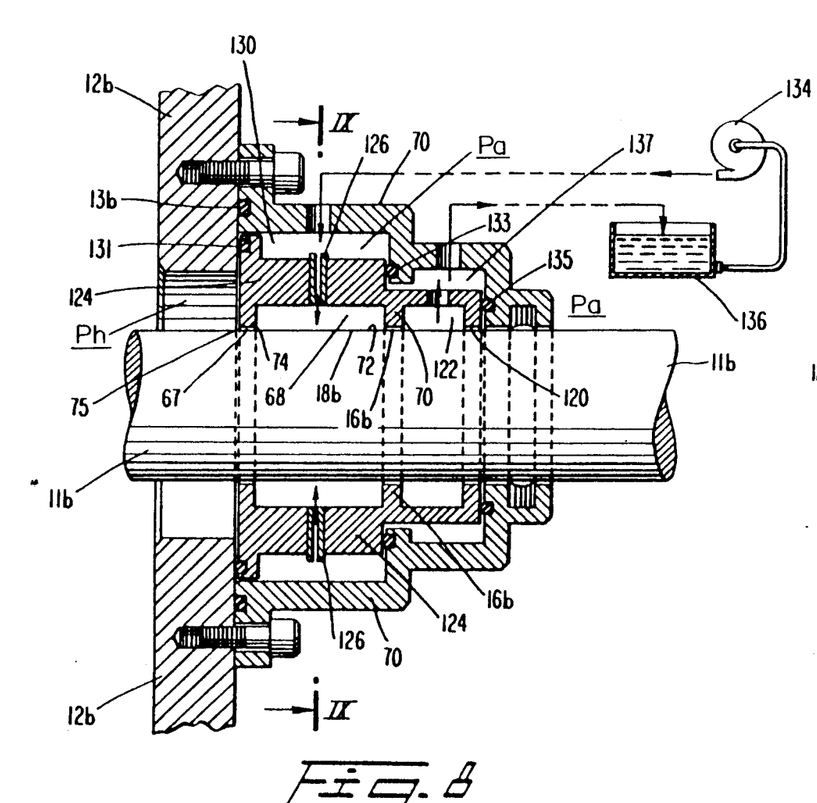
FIG. 8 is a fragmentary cross-sectional view of a further embodiment of a hydrostatic seal according to the present invention.
Figure 9:
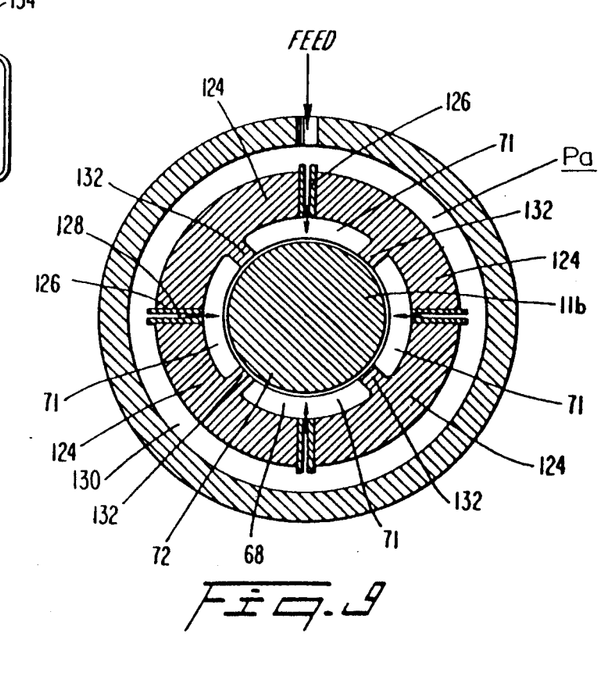
FIG. 9 is a cross-sectional view of the hydrostatic seal taken along the line IX—IX of FIG. 8.

Referring to FIGS. 8 and 9, and in accordance with another embodiment of the present invention, the opposed sealing faces are radially opposed and one of the sealing faces is radially displaceable relative to the other sealing face. As embodied herein and as shown in FIGS. 8 and 9, the shaft 11b is surrounded by a machine housing 12b and a seal housing 70 mounting on the machine housing 12b to seal the space between shaft 11b and machine housing 12b. A first sealing face 16b is located on the inside diameter of a seal ring 124 which includes the faces of dams 67, 70 and 120. A second sealing face is the outside surface of the shaft 11b. A first dam 67 on the first sealing face circumscribes the shaft and is positioned between the high pressure cavity and the interior of the housing. A second dam 70 circumscribes shaft 11b and is positioned between the high pressure cavity 68 and a discharge cavity 122.

A third dam 120 circumscribes shaft 11b and is positioned between the discharge cavity 122 and the ambient.

As shown in FIG. 9, seal ring 124 is a solid ring radially surrounding shaft 11b. Four restriction tubes 126 from the reservoir cavity 130 feed into each of the high pressure cavities of seal ring 124. A reservoir cavity 130 circumferentially surrounds seal ring 124 and is supplied with either a barrier fluid or the machine housing fluid to bias the seal ring 124 to be concentric with shaft 11b to maintain a preselected gap between shaft 11b and sealing surface 16b. The three elastomeric seals 131, 133, 135 which separate between the machine fluid and reservoir 130, between reservoir 130 and discharge cavity 137, and between discharge cavity 137 and the ambient, respectively, allow for radial movement of seal ring 124 so that the seal ring can center itself around shaft 11b.

As shown in FIG. 9, spacer dams 132 separate high pressure cavity 68 into four pocket areas 71. The number of high pressure pocket areas 71 and corresponding restriction tubes 126 is conveniently selected here as four. However, any number of high pressure pockets and corresponding restriction tubes may be chosen. The size of the seal and operating conditions dictate this number.

Pump 134 supplies barrier fluid from reservoir 136 through restricter tubes 126 into the high pressure cavity 68 as shown in FIG. 8. In the same manner as explained in reference to the embodiment shown in FIG. 1, the embodiment shown in FIG. 8 uses first dam 67 to prevent passage of the barrier fluid from high pressure cavity 68 into the interior of the housing 12B and prevents passage of machine fluid from the housing 12B into the high pressure cavity means 68. Similarly, second dam 70 and third dam 120, shown in FIG. 8, operate in the same manner as their counterparts shown in FIG. 1. In summary, the embodiments shown in FIGS. 8 and 9 are radially moving counterparts of the axially moving embodiment shown in FIG. 1 and the various alternatives which were discussed as being possible with the embodiment shown in FIG. 1 are also correspondingly possible with the embodiment shown in FIGS. 8 and 9.

The embodiment shown in FIG. 4 is similar to the embodiment shown FIG. 1, except that no discharge cavity corresponding to discharge cavity 47 of FIG. 1 is provided. Appropriate sealing of machine fluid radially outside of first dam 29c is provided in a similar fashion by barrier fluid in high pressure pocket 21c which is supplied by restrictor tubes 45c. Second dam 31c and spacer dams 33c are provided in addition to first dam 29c to form pocket 21c. Without a discharge cavity, barrier fluid will pass over second dam 31c and leak between the housing and the shaft to the ambient where it can be collected in some fashion and recycled back to reservoir 53c.

Figure 10:
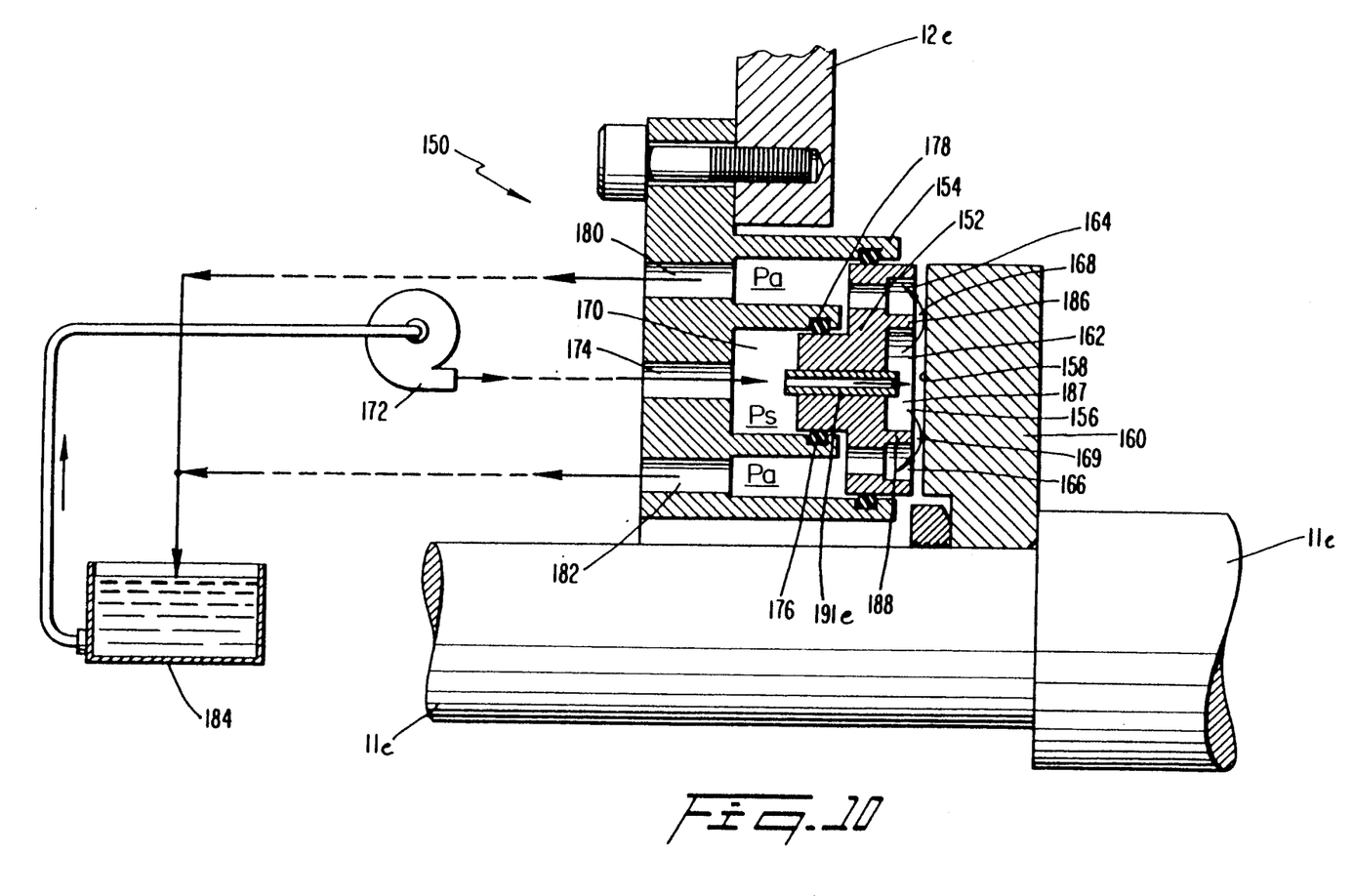
FIG. 10 is a fragmentary cross-sectional illustrating a hydrostatic axial bearing according to a preferred embodiment of the present invention.
Figure 11:
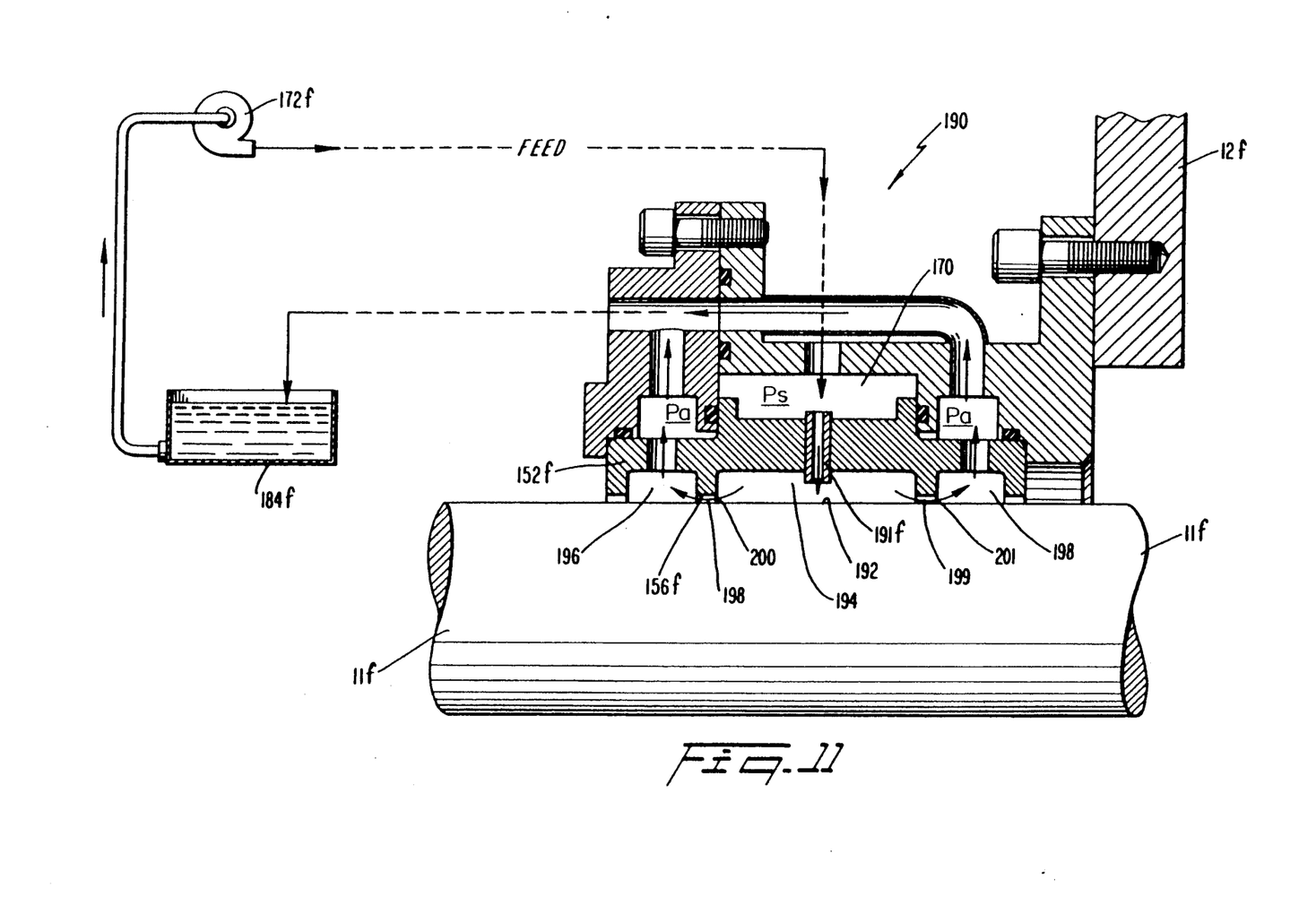
FIG. 11 is a fragmentary cross-sectional view of another preferred embodiment of a hydrostatic radial bearing according to the present invention.

Referring to FIGS. 10 and 11 and in accordance with the present invention, there is provided a hydrostatic bearing for a housing fitted with a shaft comprising opposed bearing faces on the housing and shaft; high pressure cavity means in one of the bearing faces for supplying a pressurized bearing fluid between the opposed bearing faces; and discharge cavity means in one of the bearing faces for discharging bearing fluid from between the opposed bearing faces and preventing bearing fluid from leaking between the shaft and the housing.

In the embodiment of FIG. 10, a zero leakage axial hydrostatic thrust bearing 150 is shown. The thrust bearing 150 generally operates according to the principals discussed above with respect to the hydrostatic seal shown in FIG. 1. In contrast to the hydrostatic seal of FIG. 1, bearing 150 does not have the purpose of containing machine fluid in a housing. Rather, as shown in FIG. 10, bearing 150 provides axial support on the housing 12e for a rotating shaft 11e.

An annular bearing ring 152 is mounted on the housing 12e by a bearing housing 154. Bearing ring 152 includes a first bearing face 156. A seat ring 160 is mounted on shaft 11e for rotation with the shaft 11e and includes a second bearing face 158 which opposes first bearing face 156.

The high pressure cavity means includes an annular high pressure cavity 162 in bearing face 156. The discharge cavity means includes a first annular drain cavity 164 and a second annular drain cavity 166 in bearing face 156.

A first annular dam 186 on bearing face 156 separates the high pressure cavity 162 from first discharge cavity 164 while a second annular dam 188 separates high pressure cavity 162 from second drain cavity 166. The first and second dams 186 and 188 define a high pressure pocket 187 in the high pressure cavity 162. The first and second dams 186 and 188 are also positioned to provide gaps 168 and 169 between second bearing face 158 and the respective first and second annular dams 186 and 188. The width of the gaps 168 and 169 between the second bearing face 158 and the opposing surface of the respective first and second dams 186 and 188, are each substantially narrower than the length of dams 186 and 188 in the radial direction in the embodiment shown in FIG. 10.

High pressure cavity 162 supplies a pressurized bearing fluid to gaps 168 and 169 between bearing face 156 and 158. The first and second discharge cavities 164 and 166 discharge bearing fluid from the gaps 168 and 169 to prevent bearing fluid from leaking between the shaft 11e and the housing 12e. First and second discharge cavities 164 and 166 are at a pressure $P_a$ which is preferably equal to the ambient. Bearing fluid in the discharge cavities 164 and 166 drains through the drain channels 180 and 182, respectively, to a tank 184 for pump 172.

A bearing fluid reservoir cavity 170 is defined by a portion of bearing housing 154 and bearing ring 152. Elastomer seals 176, 178 seal the space between the bearing housing 154 and bearing ring 152. Pressurized bearing fluid is pumped by pump 172 through a bearing housing feed channel 174 into bearing fluid reservoir cavity 170. Since bearing ring 152 is axially displaceable with respect to bearing housing 154 and seat ring 160, the pressure of the bearing fluid in the bearing fluid reservoir cavity 170 biases bearing ring 152 toward seat ring 160 to maintain constant width gaps 168 and 169 between second bearing face 158 and the bearing face 156 of first and second dams 186 and 188.

In such a manner, axially hydrostatic thrust bearing 150 provides a film of varying fluid pressure between the opposed bearing faces to achieve the results of a hydrostatic bearing while preventing bearing fluid from leaking between the shaft and the housing and into the internal space of the machine.

In the embodiment of FIG. 11, a zero leakage radial hydrostatic bearing 190 is shown. This radial bearing 190 generally operates according to the principals discussed above with respect to the hydrostatic seal shown in FIG. 8 and the hydrostatic thrust bearing discussed above with respect to FIG. 10. The radial bearing 190, shown in FIG. 11, provides radial support on a housing 12f for either a rotating or axially reciprocating shaft 11f.

A bearing ring 152f is noted on the housing 12f by a bearing housing 154f. Bearing ring 152f includes a circumferential first bearing face 156f which opposes a second bearing face constituted by the surface 192 of shaft 11f. Bearing face 156f includes a high pressure cavity 194 that circumscribes the shaft 11f, first and second discharge cavities 197 and 198 that also circumscribe the shaft 11f on both sides of high pressure cavity 194. The high pressure cavity is divided into a plurality of high pressure pockets. First dam 198 circumscribes the shaft between high pressure cavity 194 and discharge cavity 196, while a second dam 199 circumscribes the shaft 11f between high pressure cavity 194 and second discharge cavity 198.

Pressurized bearing fluid is supplied by pump 172f to a bearing fluid reservoir cavity 170f which feeds high pressure cavity 194 through flow restrictions such as restriction tubes 191f. Bearing fluid passes from high pressure cavity 194 through gaps 200 and 201 to discharge cavities 196 and 198 which are preferably at ambient pressure. Bearing fluid in discharge cavities 196 and 198 is drained to tank 184f to the pump 172f. Reservoir 170f provides a centering force on bearing 152f to carry the load exerted on the bearing 152f by the shaft 11f.

It will be apparent to those skilled in the art that modifications and variations can be made in the hydrostatic seal and bearing of this invention. The invention in its broader aspects is, therefore, not limited to the specific details, representative methods and apparatus, and illustrative examples shown and described in the description above. Thus, it is intended that all matter contained in the foregoing description or shown in the accompanying drawings shall be interpreted as illustrative and not in a limiting sense, accordingly, departures may be made from such details without departing from the spirit or scope of the general inventive concept as defined by the appended claims and their equivalents.

What is claimed is:

1. A hydrostatic seal for sealing, from the ambient having a pressure Pa, a pressurized machine fluid having a pressure Ph in the interior of a housing fitted with an axially-extending rotatable shaft, comprising:

opposed first and second sealing faces fixed to the housing and the shaft, respectively, movable axially relative to one another and forming an annular gap between each other, said annular gap defining a path from the interior of the housing radially through the gap to the ambient;

a seal ring housing fixed to the housing, said seal ring housing including an axial elongated reservoir;

a source of pressurized barrier fluid;

high pressure cavity means in said first sealing face for flowing a pressurized barrier fluid into the annular gap;

a seal ring having two axial ends slidably received in said axially elongated reservoir of said seal ring housing, wherein said seal ring includes said first sealing face at its axial end opposite the axially elongated reservoir and wherein said high pressure cavity means includes a first axial bore formed in said seal ring;

discharge cavity means in said first sealing face for removing pressurized barrier fluid from the annular gap;

a flow restriction tube fixed to said seal ring and in fluid communication at one end with said first axial bore and at the other end with the axially elongated reservoir, said flow restriction tube being subjected to pressure Ps at the first end, Ps being greater than Ph;

proportional pressure regulator means in fluid communication with said source of pressurized barrier fluid and said axially elongated reservoir at one end and said flow restriction means at the other end, for maintaining the ratio of Ps/Ph at a constant regardless of the rotational speed of the shaft;

dam means at the interface of said first and second sealing faces and between said high pressure cavity means and the machine fluid for restricting the flow of machine fluid toward the barrier fluid and the flow of barrier fluid toward the machine fluid; and circulating means, including said high pressure cavity means, said discharge cavity means, said flow restriction means and said flow regulator means, for circulating the pressurized barrier fluid in the annular gap in physical contact with the machine fluid at a pressure substantially equal to the pressurized machine fluid pressure, said circulating means preventing the barrier fluid from penetrating beyond said dam means into the interior of the housing and preventing the machine fluid from penetrating beyond said dam means into the annular gap.

2. The hydrostatic seal of claim 1 wherein said dam means includes a first circumferential dam means on said first sealing face defined by first and second boundaries for permitting the barrier fluid from the high pressure cavity to pass the first boundary and preventing the barrier fluid from high pressure cavity from passing the second boundary, and permitting the machine fluid from the interior of the housing to pass the second boundary and preventing the machine fluid from the interior of the housing from passing the first boundary.

3. The hydrostatic seal of claim 2 further including a second circumferential dam means on said first sealing face which is spaced from the first circumferential dam means for surrounding the high pressure cavity means and forming at least one high pressure circumferential pocket defined by said first and second circumferential dam means.

4. The hydrostatic seal of claim 3 including spacer dams extending between said first and second circumferential dam means and dividing said at least one high pressure pocket into a plurality of high pressure pockets.

5. The hydrostatic seal of claim 3 wherein a narrow gap is provided by said first circumferential dam means that has a width between the opposed sealing faces which is substantially narrower than the length along the first circumferential dam means between the first and second boundaries.

6. The hydrostatic seal of claim 5 wherein the width of said gap provided by said first circumferential dam means is between about 0.0001 inch and 0.0020 inch.

7. The hydrostatic seal of claim 1 wherein said seal ring housing and said seal ring are dimensioned relative to one another to provide a space therebetween for allowing said seal ring to angularly compensate for changes in the alignment of said sealing faces and wherein a plurality of sealing means are positioned between said seal ring and said seal housing in said space.

8. The hydrostatic seal of claim 1 including spring means interposed between said seal ring housing and seal ring for urging said sealing faces toward one another when the axially elongated reservoir is not pressurized, and wherein the force of said spring means is substantially smaller than the force on the sealing faces when the axially elongated reservoir is pressurized.

9. The hydrostatic seal of claim 1 wherein said discharge cavity means includes a second axial bore formed in said seal ring and in fluid communication with ambient pressure.

10. The hydrostatic seal of claim 9 further comprising a second dam means formed between said high pressure cavity means and said discharge cavity means.

11. The hydrostatic seal of claim 10 wherein:
the pressurized machine fluid is located radially outward of said annular gap;
said high pressure cavity means is located to the side of the gap proximate to the pressurized machine fluid; and
said discharge cavity means is located radially inward of said high pressure cavity means, whereby the resultant seal places a centrifugal force upon any barrier fluid leaking beyond said discharge cavity means that tends to force the barrier fluid back into said discharge cavity means.

* * * * *

UNITED STATES PATENT AND TRADEMARK OFFICE
CERTIFICATE OF CORRECTION

PATENT NO. : 5,052,694

DATED : October 1, 1991

INVENTOR(S) : Abraham Lipschitz

It is certified that error appears in the above-identified patent and that said Letters Patent is hereby corrected as shown below:

Claim 1, col. 13, line 19, change "axial" to --axially--.

Claim 5, col. 14, line 21, change "claim 3" to --claim 2--.

Signed and Sealed this

Fourteenth Day of July, 1992

Attest:

DOUGLAS B. COMER

*Attesting Officer*     *Acting Commissioner of Patents and Trademarks*